United States Patent [19]

Parlour

[11] Patent Number: 4,688,373
[45] Date of Patent: Aug. 25, 1987

[54] ARTICLE ORIENTING, FEEDING AND WRAPPING APPARATUS

[76] Inventor: Noel S. Parlour, 1109 Laurie Ct., Burr Ridge, Ill. 60521

[21] Appl. No.: 876,172

[22] Filed: Jun. 19, 1986

[51] Int. Cl.⁴ .................... B65B 35/34; B65B 35/44
[52] U.S. Cl. .................................. 53/542; 414/103; 414/109
[58] Field of Search ............ 53/532, 542, 543, 525; 414/103, 109

[56] References Cited

U.S. PATENT DOCUMENTS

| | | | |
|---|---|---|---|
| 2,211,433 | 8/1940 | Papendick | 53/542 X |
| 2,936,557 | 5/1960 | Fay | 414/103 X |
| 3,290,859 | 12/1966 | Talbot | 53/542 X |
| 3,500,984 | 3/1970 | Talbot | 53/542 |
| 4,020,617 | 5/1977 | Sickinger | 53/542 X |
| 4,391,560 | 7/1983 | Fardin | 53/532 X |

*Primary Examiner*—Horace M. Culver
*Attorney, Agent, or Firm*—Niro, Scavone, Haller & Niro, Ltd.

[57] ABSTRACT

In an article orienting, feeding and wrapping apparatus, a conveyor apparatus for orienting a plurality of disoriented wafer-like articles into single rows for wrapping. A conveying mechanism has receptacles for moving the articles in single rows extending transverse to the path of movement. An orienting mechanism forms a plurality of upwardly open channels extending parallel to the path of movement above the conveying mechanism and in which the disoriented articles are deposited. The channels are formed in part by vertically oscillating walls for agitating the disoriented articles and causing the articles to fall edge-wise through the channels into oriented rows in the receptacles of the conveying mechanism. The oriented rows then are fed through a series of sorting, wrapping and labeling wheels and ultimately to a discharging mechanism for discharging the sorted, wrapped and labeled rows of articles to a packaging station.

28 Claims, 19 Drawing Figures

ARTICLE ORIENTING, FEEDING AND WRAPPING APPARATUS

BACKGROUND AND SUMMARY OF THE INVENTION

This invention generally relates to apparatus for orienting, feeding and wrapping articles, particularly thin wafer-like articles such as edible candy items.

It is a continuing problem to provide apparatus or machines for wrapping various articles in compact arrays for shipping and consumption. Some articles, such as natural potato chips, simply are not applicable for compact packaging and, consequently, conventionally are packaged, shipped and consumed in and from loose arrays in bags, boxes or "tins". Such other items as cigarettes, fabricated potato chips, cookies, gum and wafer-like candies can be packaged, shipped and consumed in and from compact arrays which greatly reduce storage, shipping and display area requirements. However, the cost of packaging such items in compact arrays often contribute heavily to the ultimate selling price and/or profit that can be made from such articles. Inefficient packaging machines not only reduce production but many times require numerous machines where a more efficient single machine would be sufficient.

This invention is directed to providing a new and improved packaging machine which includes articles orienting, feeding and wrapping apparatus which is greatly simplified and extremely efficient. The apparatus is particularly directed to orienting, feeding and wrapping thin wafer-like edible commodities such as small disc-shaped candies.

An object, therefore, of the invention is to provide a new and improved apparatus of the character described.

In the exemplary embodiment of the invention, a packaging machine is disclosed and includes a conveyor apparatus for orienting a plurality of disoriented wafer-like articles into single rows for wrapping. Generally, conveying means are provided with receptacle means for moving the articles at a feeding station in single rows extending transverse to the path of movement. Orienting means form a plurality of upwardly open channels extending parallel to the path of movement above the conveying means and in which the disoriented articles are deposited. The channels have a width greater than the thickness of one of the articles and lesser than the width of the article. The channels are formed in part by vertically oscillating wall means for agitating the disoriented articles and causing the articles to fall edge-wise through the channels into oriented rows in the receptacle means of the conveying means.

More particularly, the channels are formed by a plurality of spaced, alternating stationary walls and vertically oscillating walls. The stationary and vertically oscillating walls are in the form of elongated blades extending parallel to the path of the subjacent conveying means. Common drive means are provided for both the conveying means and the orienting means. The common drive means is operatively connected to the conveying means by a continuous drive mechanism and to the vertically oscillating walls of the orienting means by an incremental drive mechanism.

Means in the form of a kick-back roller brush is rotatably mounted above the channels for eliminating stacking of the articles above the intended single rows.

The stationary wall means between the vertically oscillating means, which form the orienting channels, converge downline of the vertically oscillating wall means for closely compacting the rows of articles. Further, the downline converging stationary wall means are inclined downwardly and form part of a chute means for gravity feeding the rows of articles toward a wrapping apparatus.

The wrapping apparatus include a first, sorting wheel having a plurality of outwardly opening pockets for receiving the rows of articles seriatum from the chute means and rotatably advancing the rows of articles through loading and discharging positions. Sensor means are provided adjacent the periphery of the sorting wheel between the loading and discharging positions for sensing if any given row of articles is completely filled. Recycle means are provided for recycling an incomplete row of articles from the sorting wheel to the conveying and orienting means along with originally supplied disoriented articles.

The wrapping apparatus include a second, wrapping wheel having a plurality of outwardly opening pockets for receiving the rows of articles seriatum from the sorting wheel and rotatably advancing the rows of articles through loading and discharging stations. The loading station of the wrapping wheel is in angular alignment and adjacent to the discharging station of the sorting wheel.

A third, labeling wheel is provided with a plurality of outwardly opening pockets for receiving the rows of articles seriatum from the wrapping wheel and rotatably advancing the rows of articles through loading and discharging stations. The loading station of the labeling wheel is in angular alignment and adjacent to the discharging station of the wrapping wheel.

All three sorting, wrapping and labeling wheels are driven from the common continuous drive means of the conveying means and orienting means, with indexing means for conjointly and incrementally rotating the three wheels.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figures 1, 1A:
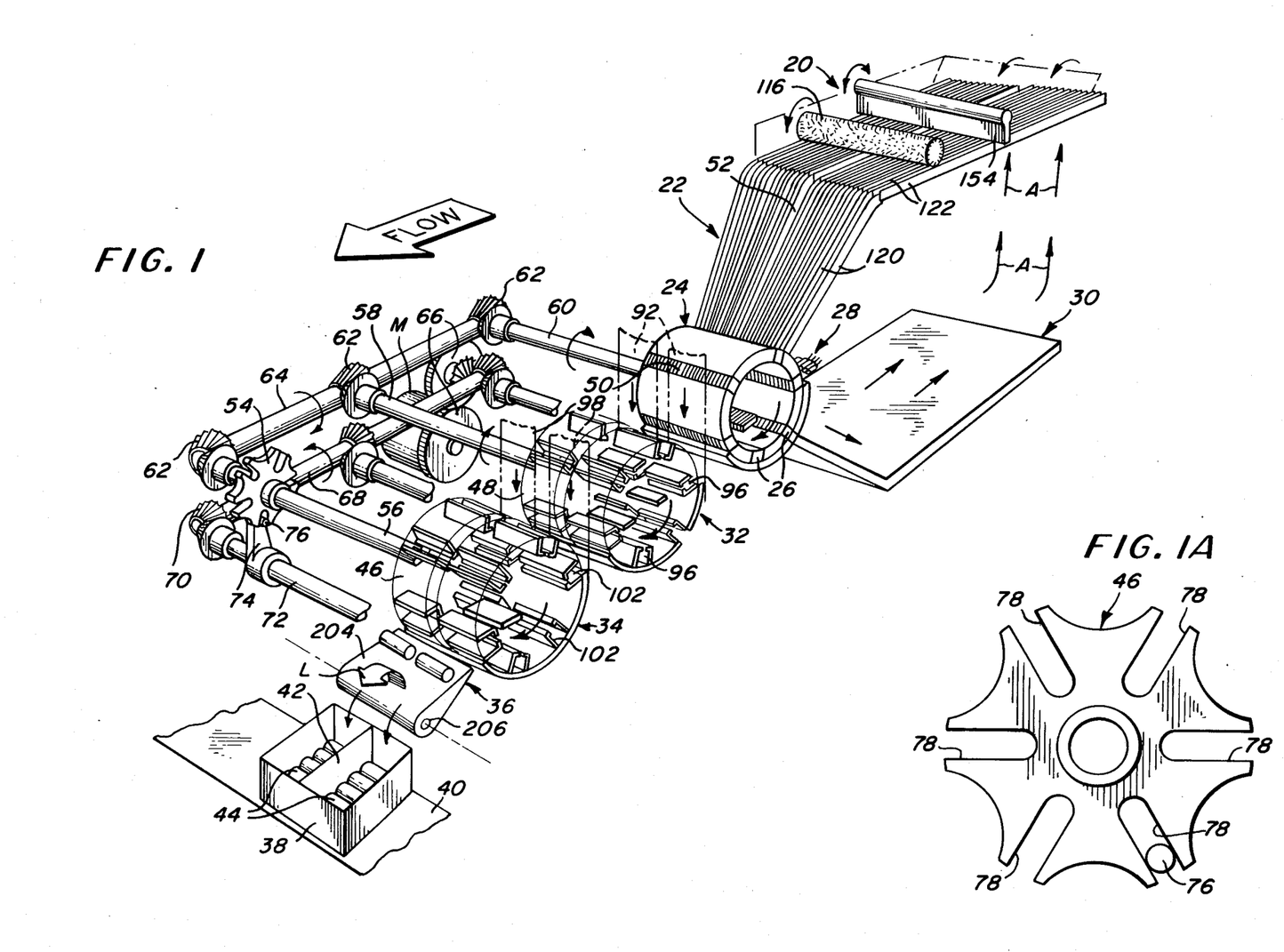
FIG. 1 is a somewhat schematic perspective view of the major components of the conveying, orienting, sorting, wrapping, labeling and discharging mechanisms of the invention.
FIG. 1A is a side elevational view of the indexing wheel for incrementally driving the sorting, wrapping and labeling wheels.

Referring to the drawings in greater detail, and first to FIG. 1, the invention is disclosed in a packaging apparatus for orienting, feeding and wrapping articles from a loose array thereof into compact single rows which are ultimately wrapped and discharged into a shipping container. The apparatus is illustrated as specifically designed for handling thin wafer-like articles, such as small disc-shaped candies. Of course, it should be understood that the particular article for which the machine is readily applicable is not considered to be a limitation upon the broad teachings of the invention.

As illustrated in FIG. 1, the articles to be wrapped are deposited at a feeding or orienting station, generally designated 20, whereat the disoriented articles are oriented into single rows for subsequent sorting, wrapping, labeling and packaging. Chute means, generally designated 22, feed the single rows by gravity, with the aid of a fluidized bed, toward a sorting wheel, generally designated 24. The sorting wheel has a plurality of outwardly opening pockets 26 for receiving the rows of articles seriatum from chute means 22 and rotatably advancing the rows of articles through loading and discharging positions. Sensor means, generally designated 28, are provided adjacent the periphery of sorting wheel 24 between the loading and discharging positions for sensing if any given row of articles is completely filled. If a given row is not completely filled, the entire incomplete row is recycled by recycling means, generally designated 30, back to the feeding station defined by orienting means 20, as indicated by arrows "A".

The sorted rows of articles then are transferred to a second, wrapping wheel, generally designated 32; from the wrapping wheel to a third, labeling wheel, generally designated 34; from labeling wheel 34 to a discharge mechanism, generally designated 36; and from discharge mechanism 36 into a container or box 38 for shipping and handling. A filled container 38 is conveyed away from the machine by an appropriate conveyor 40.

It can be seen that container 38 includes a central partition 42 to divide the container into two compartments for receiving completely wrapped rows of articles 44. By progressing backwardly through the machine, it can be seen that labeling wheel 34 is split at 46, wrapping wheel 32 is split at 48, sorting wheel 26 has gaps 50 between the ends of outwardly opening pockets 26, and chute means 22 and orienting means 20 have gaps, as at 52. It should be understood that all of the mechanisms described hereinafter on either sides of splits 46 and 48 in wheels 34 and 32, respectively, and gaps 50 and 52 in wheel 24 and chute means 22, respectively, are identical so as to provide a mechanism capable of handling two linearly oriented or side-by-side single rows of articles conjointing through the machine.

Sorting wheel 24, wrapping wheel 32 and labeling wheel 34 all are incrementally rotated by an indexing mechanism from a continuous drive means. More particularly, referring to FIG. 1A in conjunction with FIG. 1, it can be seen that an indexing wheel, generally designated 54, is fixed to a drive shaft 56 for labeling wheel 34. A drive shaft 58 for wrapping wheel 34 and a drive shaft 60 for sorting wheel 32 are coupled to drive shaft 56 for labeling wheel 34 by means of gear arrangements 62 and a coupling shaft 64 so that all three drive shafts 56, 58 and 60 are conjointly and incrementally driven. A drive motor "M" is coupled through gears 66 to a first common drive shaft 68 and gears 70 to a second common drive shaft 72 for driving wheels 24, 32 and 34. Second common drive shaft 72 has a radially projecting arm 74 having a cam roller 76 on the distal end thereof. It can be seen best in FIG. 1A that cam roller 76 is positionable within cam slots 78 in indexing wheel 46 which is fixed to drive shaft 56 for labeling wheel 34.

In operation, as second common drive shaft 72 is continuously rotated by motor "M" as described above, arm 74 and cam roller 76 will continuously rotate therewith and sequentially engage the cam roller within cam slots 78 progressively about the periphery of indexing wheel 46. Each rotation of drive shaft 72 and cam roller 76 will cause seriatum engagement of the roller with cam slots 78 and incrementally rotate indexing wheel 46 to incrementally rotate sorting wheel 24, wrapping wheel 32 and labeling wheel 34 through the drive shaft and gear arrangements described above. As shown, there are six cam slots 78 in indexing wheel 46 which would result in a 60° rotation of the indexing wheel for each revolution of drive shaft 72 and cam roller 76, thereby effecting a 60° incrementation of sorting wheel 24, wrapping wheel 32 and labeling wheel 34.

Figure 2:
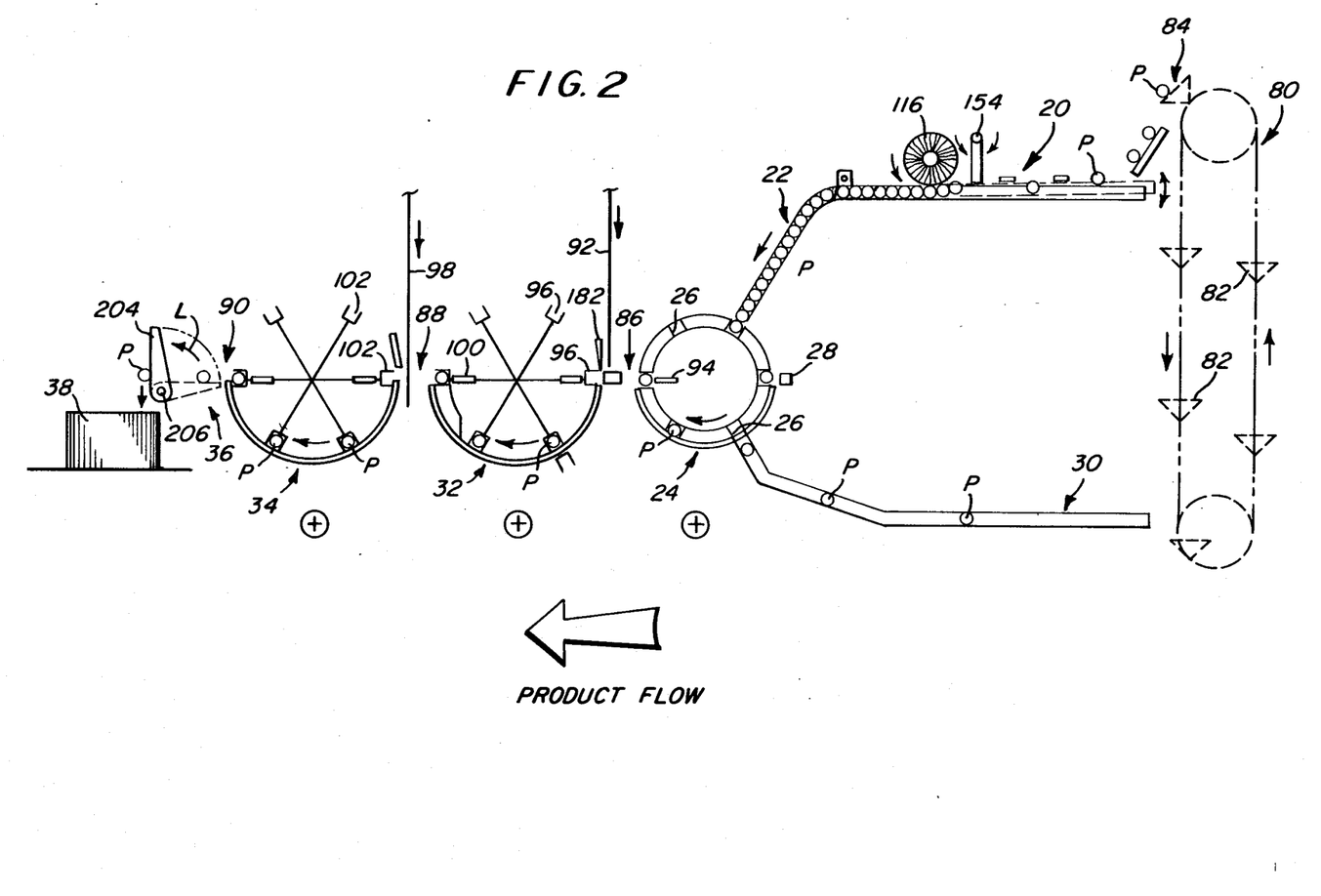
FIG. 2 is a somewhat schematic side elevational view of the flow path of the articles through the mechanisms illustrated in FIG. 1.

FIG. 2 shows a somewhat schematic flow chart of the articles through the apparatus described in relation to FIG. 1. It can be seen that a continuous "hopper" conveyor, generally designated 80, is provided in a vertical orientation at the lead end of the machine. This conveyor is of generally known construction and includes a plurality of hopper elements 82 for receiving articles from recycling means 30 to carry the articles back to orienting means 20, as indicated generally at 84.

FIG. 2 also shows that sorting wheel 24, wrapping wheel 32, labeling wheel 34 and discharge mechanism 36 all are rotatable about axes in horizontal alignments. Therefore, a discharging position, generally designated 86, for sorting wheel 24 is angularly oriented adjacent to a loading position for wrapping wheel 32. Similarly, a common position, generally designated 88, defines the discharging position for wrapping wheel 32 and the loading position for labeling wheel 34. Similarly, a common position, generally designated 90, defines a discharging position for labeling wheel 34 and a loading position for discharging mechanism 36.

It further can be seen in FIG. 2, that a sheet of wrapping material 92 is fed through position 86 between sorting wheel 24 and wrapping wheel 32. The rows of articles are pushed from outwardly opening pockets 26 in sorting wheel 24 by a pusher mechanism 94 into one of a plurality of outwardly opening pockets 96 in wrapping wheel 32. This effects a "U-fold" in wrapping material 92 which ultimately is completely wrapped about the rows of articles, as described hereinafter. Similarly, a sheet of labeling material 98 is fed downwardly between wrapping wheel 32 and labeling wheel 34 at position 88. A pusher mechanism 100 is operatively associated with wrapping wheel 32 to push the rows of articles from the appropriately aligned outwardly opening pocket 96 into engagement with labeling material 98 and into an appropriately aligned outwardly opening pocket 102 in the periphery of labeling wheel 34. This forms a "U-fold" in the labeling material about the rows of articles for subsequent folding and sealing.

Figures 3, 4, 5, 6:
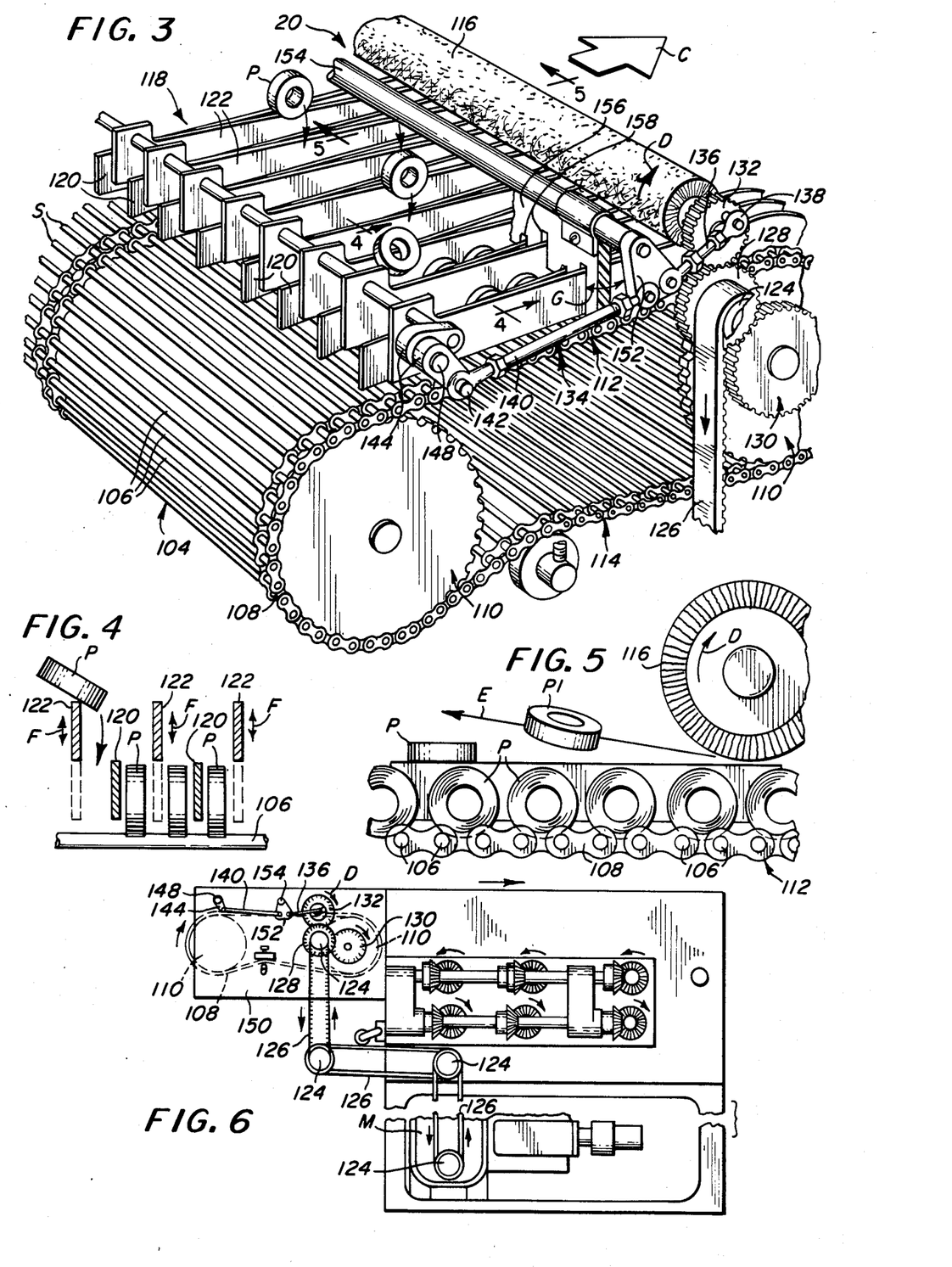
FIG. 3 is a perspective view, on an enlarged scale, of the conveying means and orienting means at the feeding station of the apparatus.
FIG. 4 is a fragmented vertical section taken generally along line 4—4 of FIG. 3.
FIG. 5 is a fragmented vertical section, on an enlarged scale, taken generally along line 5—5 of FIG. 3.
FIG. 6 is a fragmented side elevational view showing the drive means at the back of the overall machine.

FIGS. 3-5 show in greater detail the conveying means and orienting means at the lead or feeding end of the machine of this invention. In essence, a conveyor apparatus is provided and designed for orienting a plurality of disoriented products "P" in the form of wafer-like articles which are thin and disc-shaped. The articles are oriented into single rows for subsequent sorting, wrapping, labeling and packaging as described in relation to FIGS. 1-2.

More particularly, the conveyor apparatus includes conveying means, generally designated 104, having receptacle means defined by a plurality of transversely extending, parallel rods 106 for moving the articles in single rows extending transverse to the path of movement indicated by arrow "C". Rods 106 are connected at their opposite ends to a continuous drive chain 108 which is engaged about spaced sprockets 110. The chain thereby defines an upper run, generally designated 112, and a lower run, generally designated 114. The spacing "S" between adjacent rods 106 is less than the diameter of a single article "P". Therefore, it can be seen that the rods define a plurality of trough-like receptacle means for moving the articles in single rows extending transverse to the path of movement "C".

FIG. 5 shows that the articles actually will become oriented between every other pair of adjacent rods 106. Should one or more articles "P" become stacked on top of the properly oriented single rows, a kick-back roller brush 116 is provided for eliminating such stacking problems. The roller brush is incrementally rotated in a reverse direction to that of the article flow path, as indicated by arrow "D" (FIG. 5). This effects a kick-back of any stacked articles, as indicated by article "P1" and arrow "E" in FIG. 5.

Still referring to FIGS. 3 and 4, orienting means, generally designated 118, are provided above conveying means 104 for forming a plurality of upwardly open channels extending parallel to path of movement "C" and in which the disoriented articles are deposited for orientation. The channels are formed by a plurality of spaced, alternating stationary walls 120 and vertically oscillating walls 122. As the disoriented articles are deposited between the walls, the wafer-like or disc-shaped articles must be oriented in a vertical plane so as to become aligned in single rows transversely of conveying means 104. This action is best illustrated in FIG. 4 where it can be seen that stationary walls 120 are spaced alternately between vertically oscillating walls 122. The walls are in the form of elongated blades which extend parallel to the path of movement of the subjacent conveying means formed by transverse rods 106. Walls 122 vertically oscillate as indicated by double-headed arrows "F" (FIG. 4). In essence, vertically oscillating walls 102 agitate the disoriented articles and cause the articles to fall edge-wise through the channels between adjacent pairs of stationary and oscillating walls into oriented rows in the receptacle means defined by rods 106. It can be seen that the channels defined by adjacent pairs of stationary and oscillating walls have a width greater than the thickness of the articles but lesser than the width of the articles.

Referring to FIG. 6 in conjunction with FIG. 3, a common drive means is provided for both conveying means 104 and orienting means 118. Specifically, motor "M" is shown in FIG. 6 as was described in relation to FIG. 1 for incrementally driving sorting wheel 24, wrapping wheel 32, labeling wheel 34 and discharging means 36. Through a series of pulleys 124 and belts 126, motor "M" is operatively connected to the conveying means and orienting means as best illustrated in FIG. 6. The top pulley 124 of the series is fixed to a gear 128 which is conjointly in mesh with a gear 130 and a gear 132. Gear 130 is fixed to the right-hand sprocket 110 for driving chain 108 of conveying means 104. This is a continuous drive for continuously moving the oriented rows of articles. Gear 132 is fixed to roller brush 116 for continuously rotating the roller brush in the reverse direction described above as indicated by arrow "D".

In order to provide vertical oscillation of oscillating walls 122 in response to continuous drive from motor "M", a link arm assembly, generally designated 134, is provided between gear 132 and the vertically oscillating walls or blades. More particularly, a first link arm 136 is rotatably, eccentrically fixed at one end to gear 132, as at 138. A second link arm 140 is connected at one end 142 to a pair of short toggle links 144. These toggle links are fixed to a common rod 146 which extends transversely across the apparatus and through vertically oscillating walls 122. Therefore, as gear 132 rotates, the link arms, toggle arms and rod 146 effect vertical oscillation of the walls or blades 122. The vertical oscillation is effected because a stub shaft 148 between toggle arms 144 is fixed to side frame portions 150 (FIG. 6) of the machine to define a pivot axis for the mechanism.

Adjacent ends of link arms 136 and 140 are connected to a toggle arm 152 secured to a shaft 154 which is fixed to frame portions 150 to define a pivot axis for a transversely extending blade 156 which extends across the orienting means 118. Blade 156 has a plurality of slots 158 through which stationary walls 120 and oscillating walls 122 freely extend. Rod 154 defines a pivot axis for swinging blade 154 in an oscillating manner as indicated by double-headed arrow "G" (FIG. 3). This oscillatory movement of the blade prevents bunching of articles "E" as they ride along the receptacles or troughs defined by rods 106.

Figure 7:
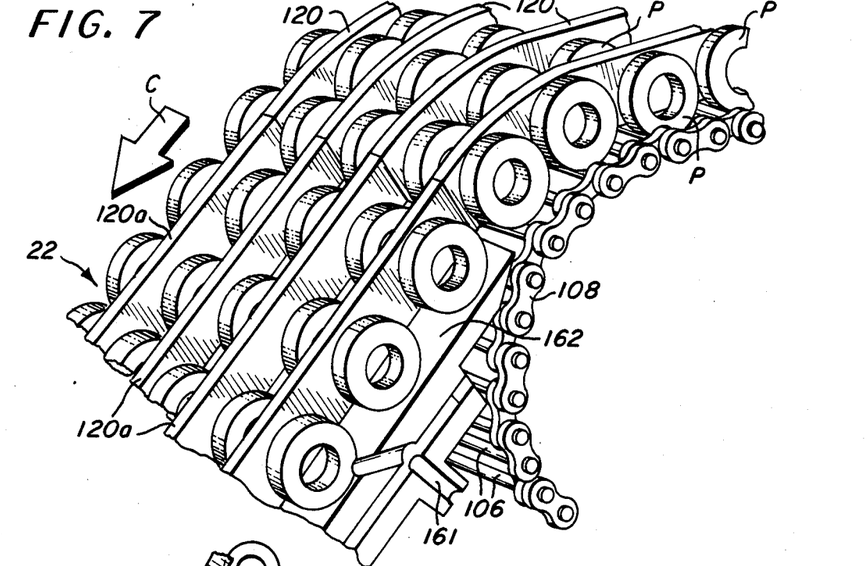
FIG. 7 is a fragmented perspective view, on an enlarged scale, of the top of the chute means.
Figure 8:
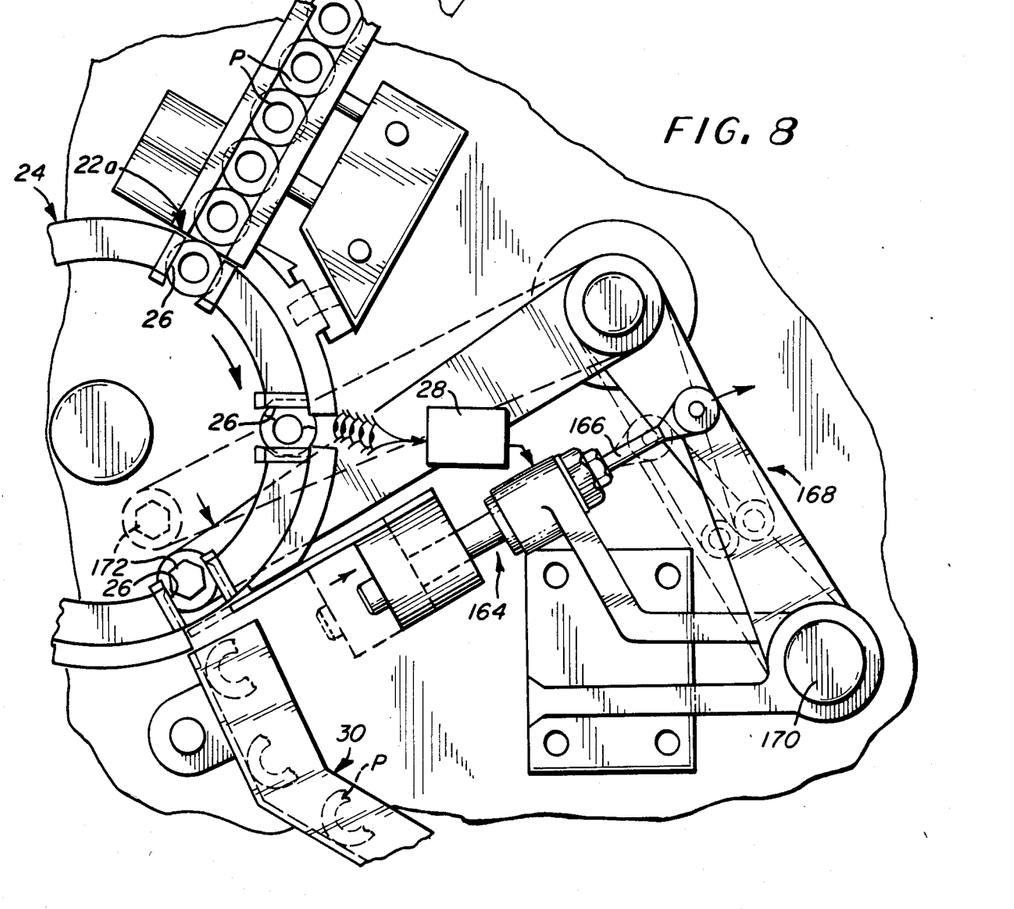
FIG. 8 is a fragmented elevational view, on an enlarged scale, of the lower end of the chute means, in conjunction with the first, sorting wheel and associated apparatus.

Referring to FIG. 7 in conjunction with FIG. 1, stationary walls or blades 120 extend beyond vertically oscillating walls 122 and converge, as well as slope, downwardly toward sorting wheel 124 to bring the articles into more compact rows and to gravity feed the articles to the sorting wheel. In essence, a plurality of extensions 120a (FIG. 7) of the walls or blades 120 slope downwardly and converge toward the sorting wheel. Blade extensions 120a cooperate with a bottom chute wall 162 to define chute means 22. In order to assist the gravity feed provided by the inclination of chute means 22, several holes 161 are provided to direct air or another appropriate fluid to chute wall 162. FIG. 8 shows that the lower end of the chute means, as at 22a, is in alignment with one of the outwardly opening pockets 26 of sorting wheel 24 when the wheel is in an incremented position. In essence, this location defines the loading position for sorting wheel 24.

FIG. 8 also shows sensing means 28 adjacent the periphery of sorting wheel 24 between the loading position and discharging position 86 (FIG. 2) for sensing if any given row of articles is not completely filled. Sensing means 28 is an optical sensor of known design and feeds back to a pneumatic drive, generally designated 164, for ejecting any particular row of articles in one of the pockets 26 which is incomplete. Drive 164 includes a piston rod 166 connected to a bell crank, generally designated 168, pivoted to the machine frame at 170. The distal end of the bell crank includes an ejecting or pushing rod 172 which enters the backside of any pocket 26 which sensor 28 has indicated to contain an incomplete row of articles. The incomplete row is ejected or pushed into recycle trough 30 (also see FIGS. 1 and 2) for recycling as described above. The movement of piston rod 166 and bell crank 168 is shown by the phantom and full-line positions in FIG. 8.

Figures 9, 10, 11, 12:
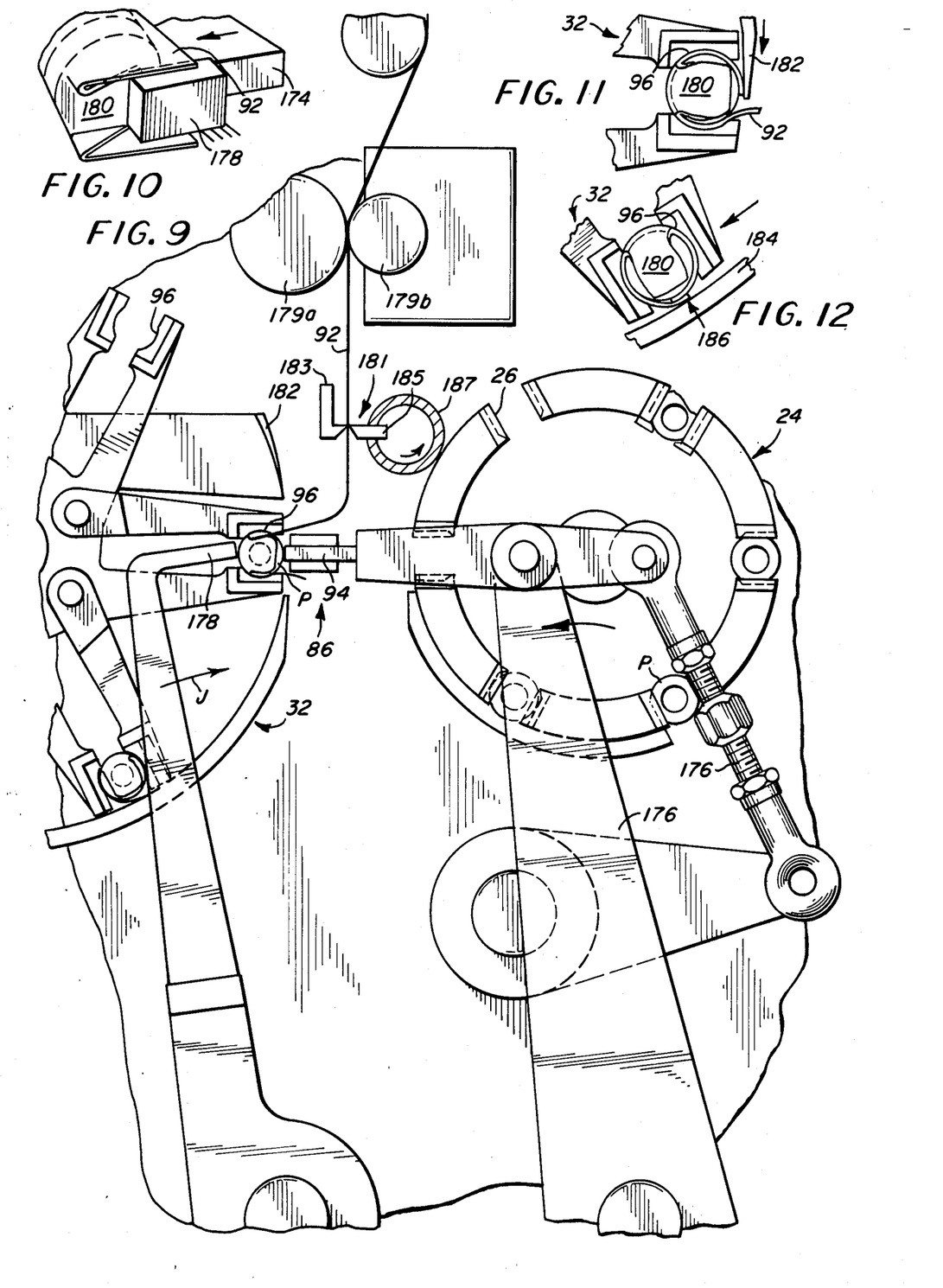
FIG. 9 is a fragmented elevational view of the pusher and folding mechanisms between the first, sorting wheel and the second, wrapping wheel.
FIG. 10 is a perspective view illustrating the action of the pusher and first fold mechanism.
FIGS. 11 and 12 are sequential side elevational views showing the mechanism and resulting action of overlapping the edges of the article wrapper.

FIG. 9 shows the action at position 86 which corresponds to the discharging position for sorting wheel 24 and labeling wheel 32. Pusher 94 (FIG. 2) is provided for ejecting compact rows of articles from an aligned pocket 26 in the sorting wheel into an aligned pocket 96 in wrapping wheel 32. This view shows more clearly how the rows of articles are pushed into engagement with wrapping material 92 to move the wrapping material with the articles into the pocket of the next wheel to form the aforementioned U-fold. Pusher 94 is driven through various linkages 176. In timed relation with operation of pusher 94 and indexing of wheels 24,32, a first fold arm 178 moves in the direction of arrow "J" to form a first fold in wrapping material 92 as shown at 180 in FIG. 10.

As further illustrated in FIG. 9, a pair of rollers 179a,179b guide wrapping material 92 to cutting assembly 181. Cutting assembly 181 includes a stationary knife blade 183 which is contacted by rotating knife blade 185 to sever a premeasured section of wrapping material 92. Rotating knife blade 185 includes a plurality of "C" washers 187 thereabout which help guide the severed portion of wrapping material 92 in position for the wrapping operation. Rotating knife blade 185 is also driven in timed relation through various linkages, including an eliptical gear (not shown) which causes the rotating blade speed to vary during its cutting operation. Specifically, rotating blade 185 is driven slowly away from stationary blade 183 and is driven more quickly in a counterclockwise direction toward the knife blade. This imparts a clean cut to wrapping material 92, while tending to prevent adherence of wrapping material to either knife blade.

FIGS. 11 and 12 show the action of a movable fold blade 182 (FIG. 11) and a stationary fold and overlap blade 184 (FIG. 12). Fold blade 182 moves downwardly to fold a first flap of the severed wrapping material 92. As wrapping wheel 32 is subsequently, incrementally rotated, fold and overlap blade 184 provides the fold for a second flap and causes the ends of the wrapping material to overlap, as at 186 in FIG. 12. Appropriate contact adhesive effects the seal along a linear seam of the row of articles in the respective pocket 96 of wrapping wheel 32.

Figures 13, 14, 15, 16, 17:
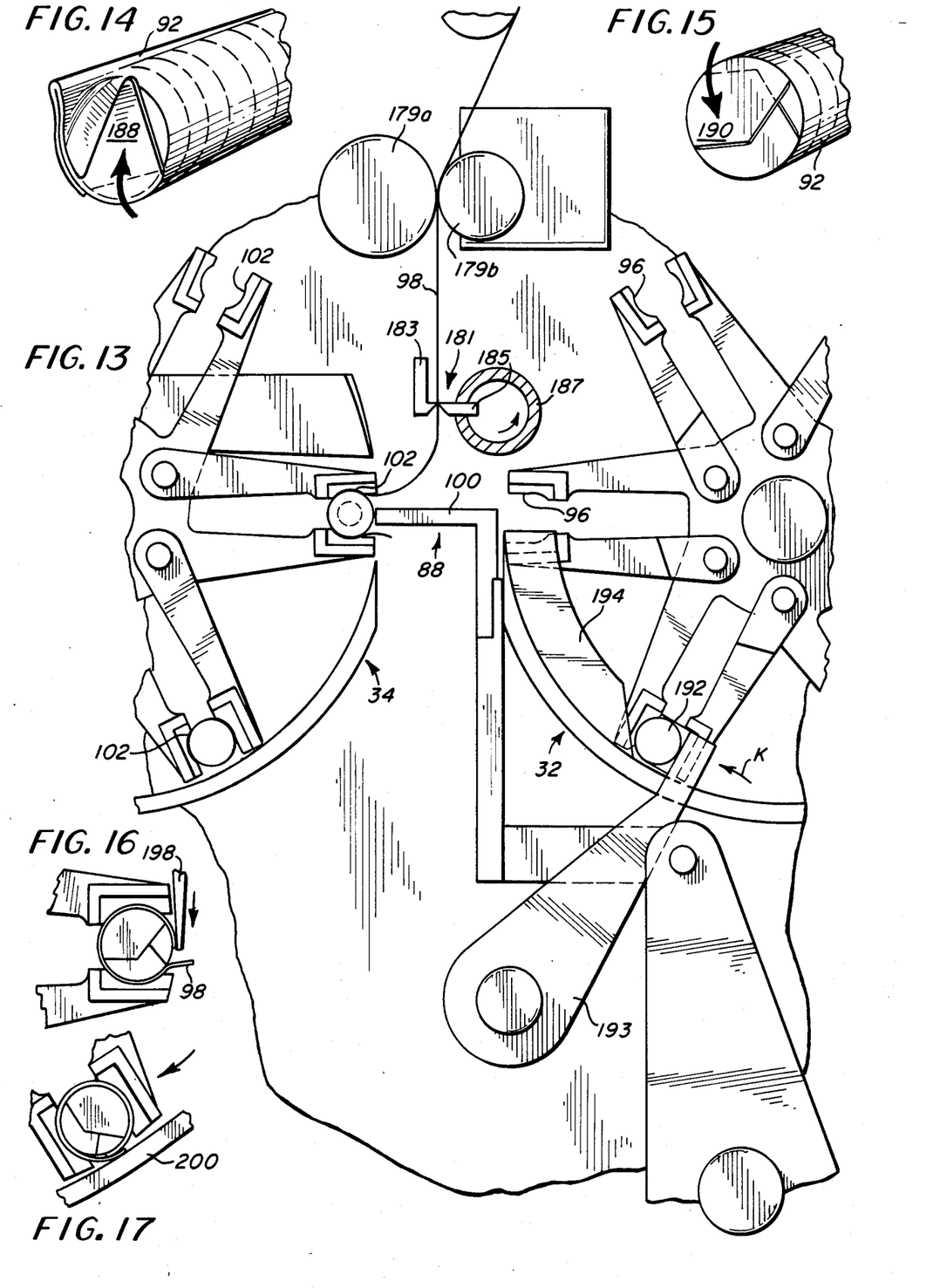
FIG. 13 is a fragmented side elevational view similar to that of FIG. 9, but showing the pusher and folding mechanisms between the second, wrapping wheel and the third, labeling wheel.
FIG. 14 is a perspective view of one end of a row of articles to illustrate the direction of the second fold for the article wrapper.
FIG. 15 is a view similar to that of FIG. 14 to illustrate the third fold of the article wrapper.
FIGS. 16 and 17 are fragmented side elevational views illustrating the overlapping of the ends of the article wrapper.

FIG. 13 shows position 88 (FIG. 2) between wrapping wheel 32 and labeling wheel 34 which defines the discharging position for the wrapping wheel and the loading position for the labeling wheel. However, before an incrementally moved row of articles reaches position 82, second and third end folds must be performed as indicated at 188 in FIG. 14 and 190 in FIG. 15. More particularly, it can be seen that a fold arm 192 (FIG. 13) is moved in the direction of arrow "K" to effect second end fold 188. Fold arm 192 is actuated by appropriate link arms 193 operatively associated with the drive means of the machine when the rows of articles are at the momentary incremented position shown in FIG. 13. It may be appreciated that while moveable fold arm 192 is illustrated, appropriate end folds may be effected through various other means including, but not limited to, stationary cams positioned about wrapping wheel 32. Such stationary cams may be configured to perform more than one fold operation through inclusion of appropriate fold guides as wrapping wheel 32 is incremented.

As the articles subsequently are incremented to the discharging position as indicated at 88, third fold 190 is effected by a stationary fold blade 194. Therefore, by the time the rows of articles reach the discharging position of wrapping wheel 32, the linear edges of the wrapping material have been overlapped and three folds have been effected at the ends of the rows of articles.

Still referring to FIG. 13, pusher 100 (FIG. 2) is provided for ejecting the wrapped rows of articles from wrapping wheel 32 and moving the rows into engagement with labeling material 98 to effect a U-fold about the wrapped rolls. Pusher 100 is similar to pusher 94 (FIG. 9) except that pusher 100 can be connected to and operatively movable at the same time as fold arm 192, as shown in FIG. 13.

FIGS. 16 and 17 show the action of another doctor 198 and fold and overlap blade 200 for severing labeling material 98 from a supply thereof and overlapping and sealing the linear edges thereof. In this instance, since material 98 is for labeling purposes, rather than wrapping and sealing, a tubular sheaf is formed about the previously wrapped rows of articles and no end folds are necessary.

Figure 18:
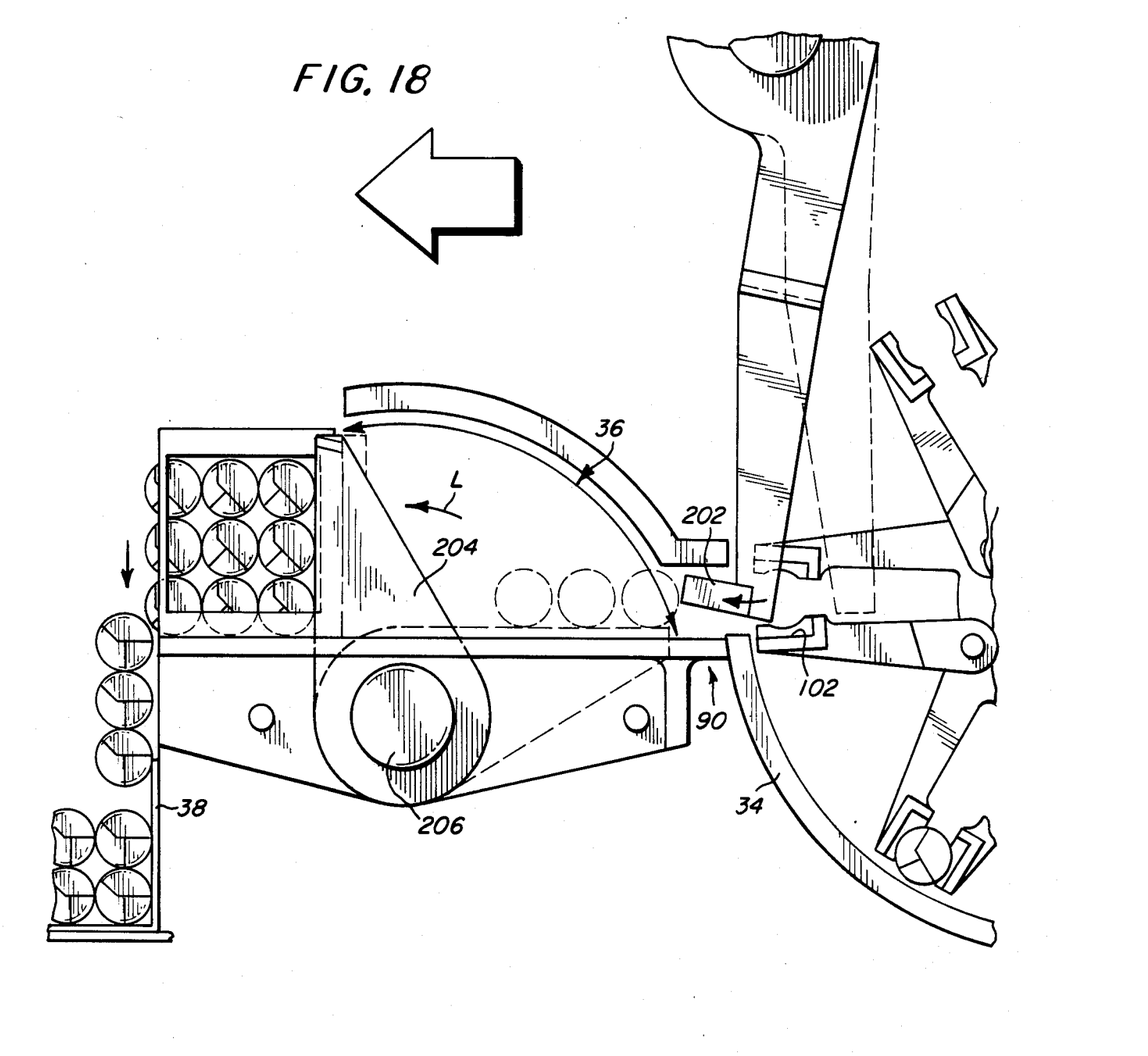
FIG. 18 is a side elevational view illustrating the discharge station of the machine for depositing completely wrapped articles into a container.

FIG. 18 shows the discharging position 90 (FIG. 2) of the wrapped and label rows of articles from labeling wheel 34 to discharging mechanism 36 which moves the wrapped and labeled rows of articles into container 38. A pusher arm 202 is provided for moving the wrapped and labeled articles from the properly positioned pocket 102 of the labeling wheel onto discharge mechanism 36. As seen in FIGS. 1 and 2, in conjunction with FIG. 18, discharge mechanism 36 includes a paddle-like member 204 pivotally mounted on the machine at 206 for incremental rotation in the direction of arrow "L". This effects depositing of the completely wrapped and labeled articles into container 38.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. In a wrapping machine, a conveyor apparatus for orienting a plurality of disoriented wafer-like articles into single rows for wrapping, comprising:
conveying means having receptacle means for moving the articles in single rows extending transverse to the path of movement; and
orienting means forming a plurality of upwardly open channels extending parallel to said path of movement above the conveying means and in which the disoriented articles are deposited, said channels having a width greater than the thickness of one of the articles and lesser than the width of the article, and said channels being formed in part by vertically oscillating wall means for agitating the disoriented articles and causing the articles to fall edgewise through the channels into oriented rows in the receptacle means of the conveying means.

2. The apparatus of claim 1 wherein said channels are formed by a plurality of spaced, alternating stationary walls and vertically oscillating walls.

3. The apparatus of claim 2 wherein said stationary and vertically oscillating walls are in the form of elongated blades extending parallel to the path of movement of the subjacent conveying means.

4. The apparatus of claim 1, including common drive means for both said conveying means and said orienting means.

5. The apparatus of claim 4 wherein said common drive means is operatively connected to the conveying means by a continuous drive mechanism and to the vertically oscillating wall means of the orienting means by an incremental drive mechanism.

6. The apparatus of claim 1, including means for eliminating stacking of the articles above the intended single rows.

7. The apparatus of claim 6 wherein said lastnamed means include a kick-back roller brush rotatably mounted above said channels.

8. The apparatus of claim 1 wherein said channels are formed in part by stationary wall means between said vertically oscillating wall means, the stationary wall means converging downline of the vertically oscillating wall means for closely compacting the rows of articles.

9. The apparatus of claim 8 wherein said downline converging stationary wall means are inclined downwardly and form part of a chute means defining aperture means therein for directing an airstream therethrough to provide a fluidized bed for gravity feeding the rows of articles toward a wrapping apparatus.

10. The apparatus of claim 9 wherein said wrapping apparatus include a first, sorting wheel having a plurality of outwardly opening packets for receiving the rows of articles seriatim from the chute means and rotatably advancing the rows of articles through loading and discharging positions.

11. The apparatus of claim 10, including sensor means adjacent the periphery of the sorting wheel between the loading and discharging positions for sensing if any given row of articles is completely filled.

12. The apparatus of claim 11, including recycle means for recycling an incomplete row of articles from the sorting wheel to the conveying and orienting means.

13. The apparatus of claim 10, including a second, wrapping wheel having a plurality of outwardly opening packets for receiving the rows of articles seriatim from the first, sorting wheel and rotatably advancing the rows of articles through loading and discharging positions, the loading position being in angular alignment and adjacent to the discharging position of the first, sorting wheel.

14. The apparatus of claim 13, including means operatively associated with said second, wrapping wheel for overlapping the linear edges and folding the ends of a wrapping material about the rows of articles held by the outwardly opening pockets in the wrapping wheel.

15. The apparatus of claim 13, including pusher means for pushing the rows of articles from a pocket in the first, sorting wheel to an aligned pocket in the second, wrapping wheel.

16. the apparatus of claim 13, including a third, labeling wheel having a plurality of outwardly opening pockets for receiving the rows of wrapped articles seriatim from the second, wrapping wheel and rotatably advancing the rows of articles through loading and discharging positions, the loading position being in angular alignment and adjacent to the discharging position of the second, wrapping wheel.

17. The apparatus of claim 16, including means operatively associated with said third, labeling wheel for overlapping the linear edges of a labeling material about the rows of articles held by the outwardly opening pockets in the labeling wheel.

18. The apparatus of claim 16, including pusher means for pushing the rows of articles from a pocket in the second, wrapping wheel to an aligned pocket in the third, labeling wheel.

19. The apparatus of claim 16, including discharging means in angular alignment and adjacent to the discharging position of the third, labeling wheel for receiving the rows of wrapped and labeled articles seriatim from the labeling wheel and advancing the articles to a packaging station.

20. The apparatus of claim 1 wherein said conveying means include a plurality of rod-like members extending transversely of said path of movement and spaced in a direction parallel to the path of movement to define said receptacle means for moving the articles in single rows.

21. The apparatus of claim 20 wherein said rod-like members span and are driven by generally parallel conveyor chain means beneath said orienting means.

22. A conveyor apparatus for orienting a plurality of disoriented wafer-like articles into single rows for wrapping, comprising:
conveying means having receptacle means for moving the articles in single rows extending transverse to the path of movement; and
orienting means formed by a plurality of spaced, alternating stationary walls and vertically oscillating walls forming upwardly open channels extending generally parallel to said path of movement above the conveying means and in which the disoriented articles are deposited, the wall means being spaced greater than the thickness of one of the articles and lesser than the width of the articles, the vertically oscillating walls effectively agitating the disoriented articles and causing the articles to fall edge-wise through the channels into oriented rows in the receptacle means of the conveying means; and common drive means for both said conveying means and said vertically oscillating walls, the common drive means being operatively connected to the conveying means by a continuous drive mechanism and to the vertically oscillating walls by an incremental drive mechanism.

23. The apparatus of claim 22, including means for eliminating stacking of the articles above the intended single rows.

24. The apparatus of claim 23 wherein said last-named means include a kick-back roller brush rotatably mounted above said channels.

25. The apparatus of claim 22 wherein said stationary walls converge downline of the vertically oscillating walls for closely compacting the rows of articles.

26. The apparatus of claim 25 wherein said downline converging stationary walls are inclined downwardly and form part of a chute means for gravity feeding the rows of articles toward a wrapping machine.

27. The apparatus of claim 22, including sensor means downline of said orienting means for sensing if any given row of articles is completely filled.

28. The apparatus of claim 27, including recycle means for recycling an incomplete row of articles to the conveying and orienting means in response to said sensing means.

* * * * *

UNITED STATES PATENT AND TRADEMARK OFFICE
CERTIFICATE OF CORRECTION

PATENT NO. : 4,688,373

DATED : August 25, 1987

INVENTOR(S) : Noel S. Parlour

It is certified that error appears in the above—identified patent and that said Letters Patent is hereby corrected as shown below:

(56) References Cited

U.S. PATENT DOCUMENTS

| | | | |
|---|---|---|---|
| 2,211,433 | 8/1940 | Papendick | 53/542 X |
| 2,936,557 | 5/1960 | Fay | 414/103 X |
| 3,290,859 | 12/1966 | Talbot | 53/542 X |
| 3,500,984 | 3/1970 | Talbot | 53/542 X |
| 4,020,617 | 5/1977 | Sickinger | 53/542 X |
| 4,391,560 | 7/1983 | Fardin | 53/532 X |
| 4,519,180 | 5/1985 | Maure | 53/234 |
| 3,924,386 | 12/1975 | Schmermund | 53/60 |
| 4,092,816 | 6/1978 | Seragnoli | 53/234 |
| 4,484,432 | 11/1984 | Oberdorf | 53/575 |

FOREIGN PATENT DOCUMENTS

| | | | |
|---|---|---|---|
| 1,590,311 | 5/1981 | Great Britain | B65G |

Signed and Sealed this

Eleventh Day of October, 1988

Attest:

DONALD J. QUIGG

Attesting Officer     Commissioner of Patents and Trademarks